(12) United States Patent
Borstel et al.

(10) Patent No.: US 7,083,170 B2
(45) Date of Patent: Aug. 1, 2006

(54) ROD OR PISTON PRIMARY SEAL

(75) Inventors: Dieter Von Borstel, Guderhandviertel (DE); Günter Reichow, Seevetal (DE); Hans-Jürgen Timmermann, Hamburg (DE)

(73) Assignee: Carl Freudenberg KG, Meinheim (DE)

( * ) Notice: Subject to any disclaimer, the term of this patent is extended or adjusted under 35 U.S.C. 154(b) by 0 days.

(21) Appl. No.: 10/116,214

(22) Filed: Apr. 4, 2002

(65) Prior Publication Data
US 2002/0153665 A1 Oct. 24, 2002

(30) Foreign Application Priority Data
Apr. 9, 2001 (DE) ................. 101 17 662

(51) Int. Cl.
*F16J 15/16* (2006.01)
(52) U.S. Cl. ............. 277/589; 277/459; 277/464; 277/581; 277/552; 277/926
(58) Field of Classification Search ........ 277/581, 277/582, 589, 552, 563, 926, 514, 459, 464, 277/465
See application file for complete search history.

(56) References Cited

U.S. PATENT DOCUMENTS

| | | | | |
|---|---|---|---|---|
| 3,109,661 A | * | 11/1963 | Swaim et al. | 277/589 |
| 3,955,859 A | * | 5/1976 | Stella et al. | 384/215 |
| 4,284,280 A | * | 8/1981 | Bertram et al. | 277/558 |
| 4,344,631 A | * | 8/1982 | Winn | 277/552 |
| 4,425,838 A | * | 1/1984 | Pippert | 277/563 |
| 4,681,327 A | * | 7/1987 | d'Agostino et al. | 277/587 |
| 4,723,782 A | * | 2/1988 | Muller | 277/589 |
| 4,819,952 A | * | 4/1989 | Edlund | 277/589 |
| 4,828,272 A | * | 5/1989 | Pedersen | 277/589 |
| 4,953,876 A | * | 9/1990 | Muller | 277/556 |

(Continued)

FOREIGN PATENT DOCUMENTS

DE 36 20 539 12/1987

(Continued)

*Primary Examiner*—Alison K. Pickard
(74) *Attorney, Agent, or Firm*—Kenyon & Kenyon LLP

(57) ABSTRACT

A rod or piston primary seal, which includes a primary seal (2) facing the space (1) to be sealed and a secondary seal (3) facing away from it, in which the primary seal (2) is fitted into the groove (4), of a holding element (5), open in the direction of the relatively movable machine part (11) which is bounded, on the side facing away from the space (1) to be sealed, by a first side surface (7) which extends essentially at right angles to the sealing axis (6), and includes a sealing edge ring (8) made of tough, hard plastic which has a sealing edge (9) lying adjacent to the machine part (11) and is pressed with its sealing edge (9) onto the machine part (11) by a profile ring (10) made of elastomeric material which is supported on the bottom surface (12) of groove (4) and lies adjacent to sealing edge ring (8) with its inner surface (13), the sealing edge ring (8) having a profile bounded essentially by a right angle between the sealing edge (9) and the bounding surface (14) facing the first side surface (7); and, in the unloaded state of seal (2), surface (15) bounding the sealing edge (9) on the side facing away from the pressure subtends an angle ($\beta$) of at most 8° with the sealing axis (6); and the sealing edge ring (8) is penetrated by at least one discharge opening (16) positioned between sealing edge (9) and the outer surface of wiper ring (8) and opens out onto the bounding surface (14).

19 Claims, 3 Drawing Sheets

U.S. PATENT DOCUMENTS

| | | | |
|---|---|---|---|
| 4,995,623 A | * | 2/1991 | Wada et al. ............... 277/552 |
| 5,066,027 A | * | 11/1991 | Edlund ...................... 277/556 |
| 5,082,295 A | * | 1/1992 | Wetzel ...................... 277/550 |
| 5,149,107 A | * | 9/1992 | Maringer et al. ........... 277/556 |
| 5,169,160 A | * | 12/1992 | Gaskill et al. .............. 277/438 |
| 5,249,813 A | * | 10/1993 | Botto ......................... 277/556 |
| 5,291,974 A | * | 3/1994 | Bianchi ................. 188/322.17 |
| 5,433,452 A | * | 7/1995 | Edlund et al. ............. 277/589 |

FOREIGN PATENT DOCUMENTS

DE 196 54 357 6/1998

* cited by examiner

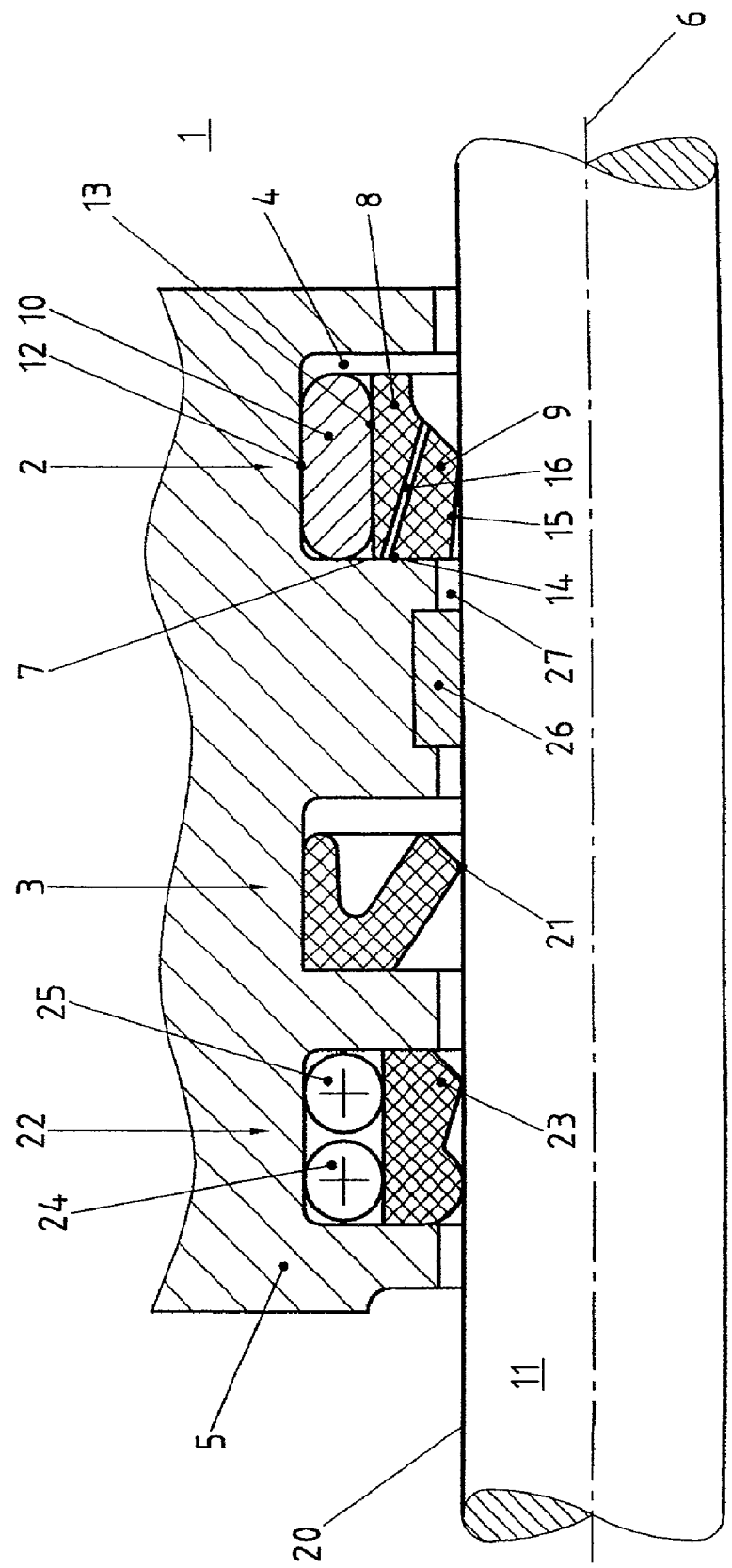

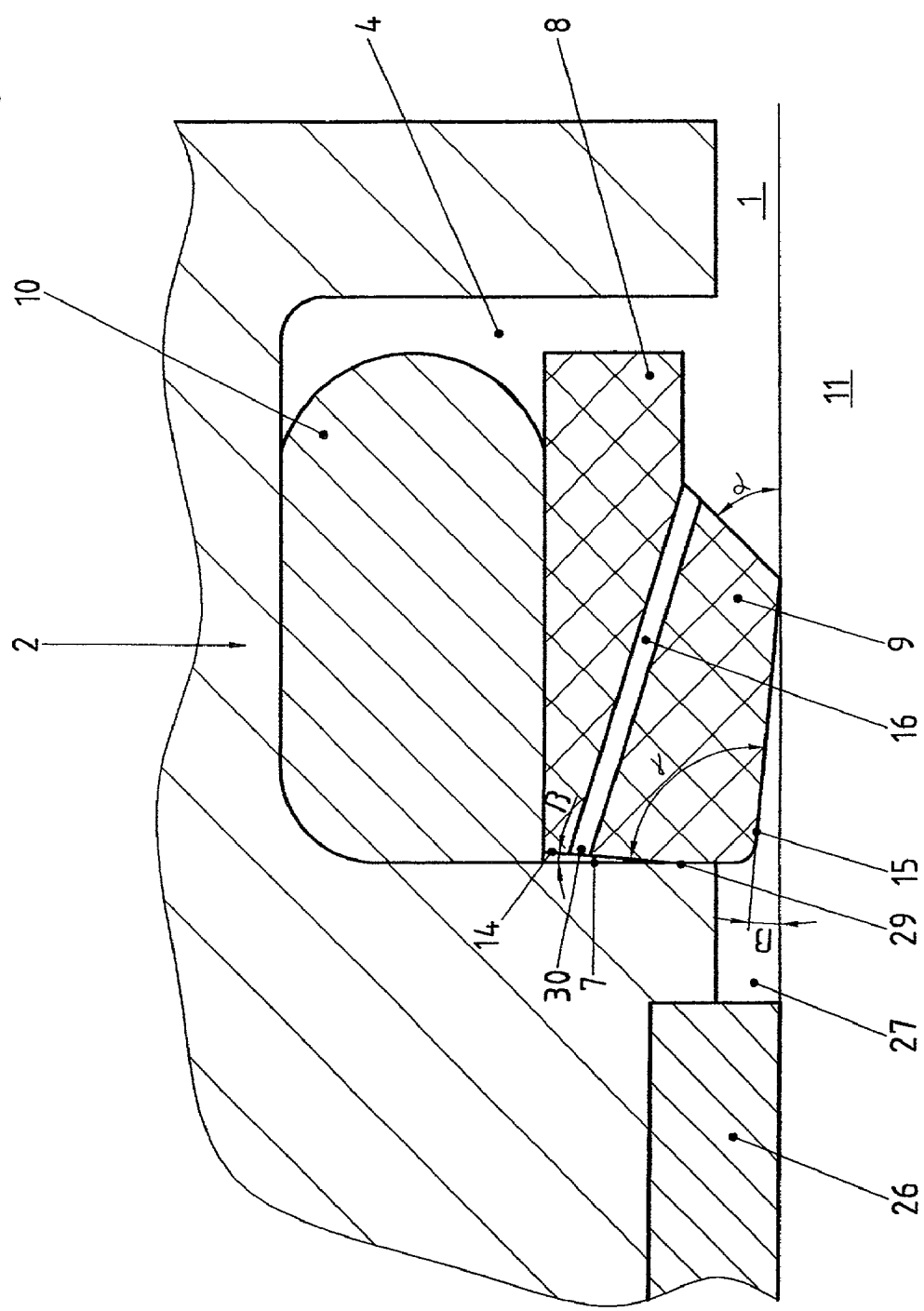

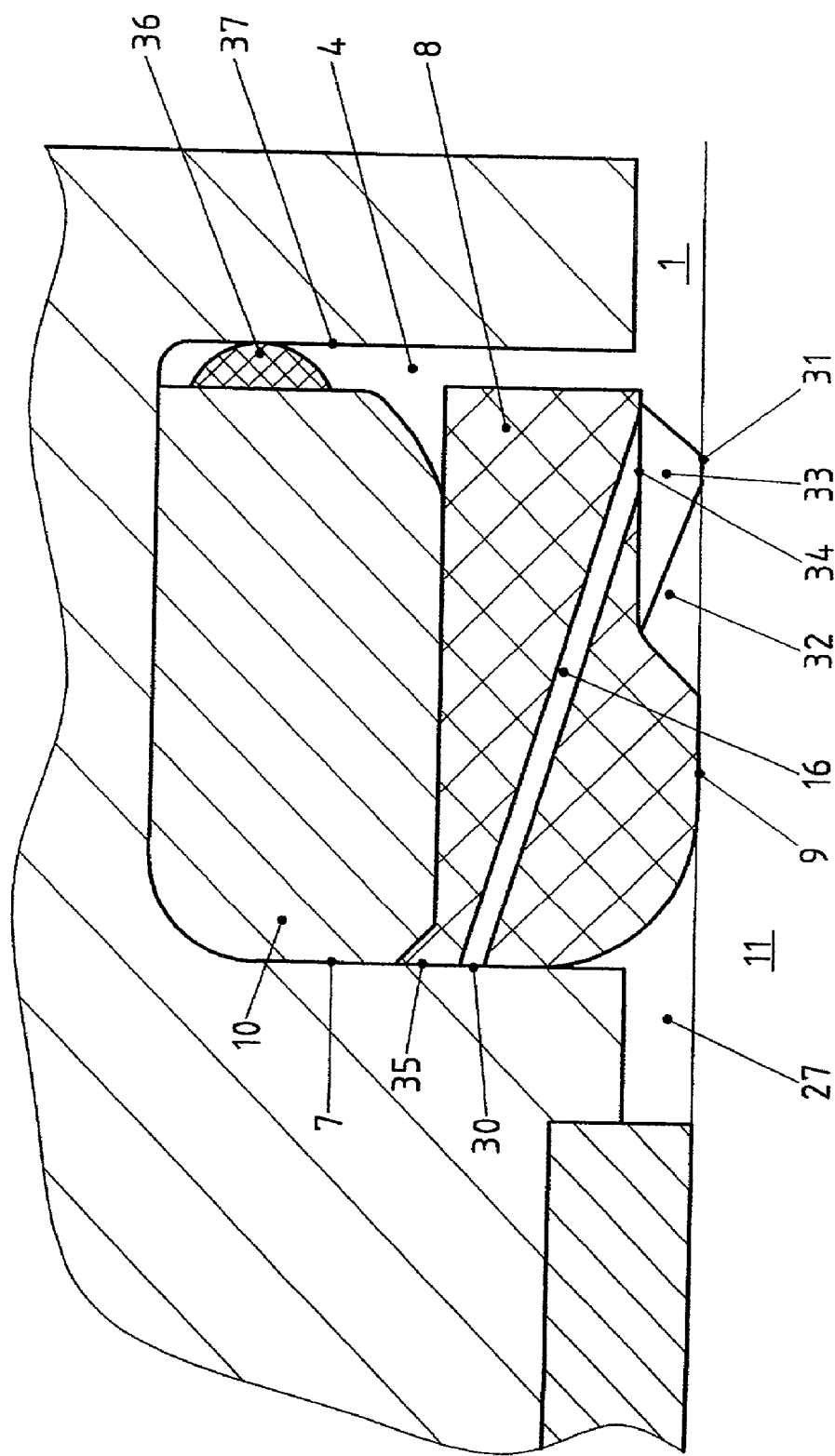

ROD OR PISTON PRIMARY SEAL

BACKGROUND OF THE INVENTION

1. Field of the Invention

The invention relates to sealing arrangements which are used for sealing axially movable rods or pistons, in order to seal a high-pressure side from a low-pressure side.

2. Description of Related Art

For these seals, frequently sealing edge rings are used, which are made of tough, elastic plastic based on PTFE or a harder thermoplastic which have one or more sealing edges at their inner circumferential surface. On their outer side, the sealing edge rings have a profile ring made of a softer elastomer material additionally pressed on radially and sealed. Sealing edge ring and profile ring are installed in a housing groove. When several seals are arranged one after another on a rod, in the case of translatory motion of the two machine parts to each other, an inverted pressure situation can occur, whereby the pressure difference reverses itself, that is, the low-pressure side becomes the high-pressure side, and the high-pressure side becomes the low-pressure side. This may cause inadmissible deformations to appear on the sealing edge ring, which may result in leakage or early failure of the sealing arrangement. Pressure reversal occurs particularly when a pressure drop takes place on the high-pressure side, and the pressure build-up in the sealing space between the primary and secondary seal remains at a higher pressure level, or drops to the level of the high-pressure side only with a great delay in time. In this connection, the pressure in the sealing space can clearly be above the maximum operating pressure. Besides the rise in frictional force in the entire sealing system, under these circumstances the sealing edge ring of the primary seal may be twisted. The initial contact compression of the sealing edge is interfered with by plastic deformation and wear to such an extent that a sufficient sealing function is no longer present.

From DE 196 54 357 A1 a sealing arrangement has become known in which the contact surface of the sealing ring is provided with at least one connecting duct via which the high-pressure side and the low-pressure side may be connected. Clamping ring and sealing ring having the connecting duct are aligned with each other in such a way that the high-pressure side is closed off from the low-pressure side by the clamping ring and that, in an inverted pressure situation, the connecting duct is freed. In this respect the clamping ring works like a check valve.

Another solution to the problem may be seen in DE 36 20 539 A1. There, also, a sealing ring made of elastic plastic and a press-on ring are used. On its inner surface facing towards the rod, the sealing ring has two axially displaced annular sealing edges, and has at least one duct starting from the inner surface, running between the sealing edges and opening out into the outer surface of the sealing ring. The opening of the duct is covered by the clamping ring. In this manner there is created a sort of safety valve, and, as soon as the intermediate pressure between the sealing edges exceeds the value of the surface compression in response to which the clamping ring lies on top of the orifice of the duct, the clamping ring lifts off from the opening, and fluid can flow back again into the space to be sealed via the duct. Using this solution, the space formed by two sealing edges of a seal is ventilated.

SUMMARY OF THE INVENTION

It is an object of the invention to create a sealing arrangement which is simple in design and which counteracts a pressure build-up in the sealing space between two individual seals. In the case of a pressure drop on the high-pressure side, a pressure build-up in the sealing space should not be clamped in at a higher pressure level or rather may follow the pressure drop on the high-pressure side only greatly delayed in time. At the same time, when there is a renewed pressure increase on the high-pressure side, none or only a small pressure increase should take place in the sealing intermediate space.

These and other objects of the invention are achieved by a rod or piston primary seal, using a primary seal facing space (1) to be sealed and a secondary seal facing away from it, in which the primary seal is fitted into an open groove in a holding element open in the direction of the relatively movable machine part which is bounded, on the side facing away from the space to be sealed, by a first side surface which extends essentially at right angles to the sealing axis, and includes a sealing edge ring made of tough plastic which has a sealing edge lying against the machine part and is pressed with its sealing edge onto the machine part by a profile ring made of elastomeric material which is supported on the bottom surface of the groove and is adjacent to the sealing edge ring with its inner surface, and, according to the present invention, is attained in that the sealing edge ring has a profile bounded essentially by a right angle between the sealing edge and the bounding surface facing the side surface; and in the unloaded state of the seal, the surface bounding the sealing edge on the side facing away from the pressure subtends an angle of at most 8° with the sealing axis; and the sealing edge ring is penetrated by at least one discharge opening positioned between the sealing edge on the high-pressure side and the outer surface of the sealing edge ring and opens out onto the bounding surface on the low-pressure side. Such a seal has broad applications because it can be applied independently of the design of the secondary seal. It is easy to manufacture and effective at the lowest pressure differences. As soon as a reversal of the pressure relationship appears, the orifice of the discharge opening is freed and fluid can flow back in the opposite direction.

BRIEF DESCRIPTION OF THE DRAWINGS

The present invention will be described in greater detail with reference to the following drawings wherein:

FIG. 1 shows a rod seal having a plurality of sealing elements, in cross section.

FIG. 2 shows the primary seal according to FIG. 1, in an enlarged representation.

FIG. 3 shows another development of the primary seal, in cross section.

DETAILED DESCRIPTION OF THE INVENTION

In order to achieve great functional reliability, it is possible to provide the sealing edge ring, on the side of the sealing edge facing the space to be sealed, with a peripheral support protuberance, and to ventilate the space between the sealing edge and the support protuberance by at least one axial groove in the support protuberance. During its production, the support protuberance is developed so that its nominal diameter essentially matches that of the sealing edge.

In order to achieve an axial orientation between sealing edge ring and profile ring, the sealing edge ring can grip from behind the profile ring on the side facing away from the space to be sealed, using a first projection. In addition, the press-on ring can be supported by a side protuberance on the side surface of the groove facing the space to be sealed.

FIG. 1 shows a holding element 5 in cross section, for example, a housing wall, through which machine part 11 passes. On the right side of holding element 5 there is the space 1 to be sealed. The sealing arrangement may have different parts. In this connection, a primary seal 2 facing space 1 that is to be sealed is provided, and a secondary seal 3 facing away from primary seal 2. Secondary seal 3 is designed in the present example as a lip seal having lip 21. In many cases a double-acting wipe seal 22 is also applied. This is made up of a sealing ring 23, which is held by two clamping rings 24 and 25, and is pressed against machine part 11. A guiding ring 26, made of a suitable material, is provided for machine part 11. Primary seal 2 is fitted into a groove 4 which is in holding element 5. In particular, groove side surface 7 extends essentially at right angles to sealing axis 6. Primary seal 2 is made up of the sealing edge ring 8, which is made of tough, hard plastic, preferably of PTFE, and which has a sealing edge 9 lying adjacent to machine part 11. Sealing edge ring 8 is pressed against machine part 11 by profile ring 10, made of elastomeric material. Profile ring 10 is supported by bottom surface 12 of groove 4. Profile ring 10 lies adjacent to sealing edge ring 8 with its inner surface 13. Bounding surface 14 of sealing edge ring 8 lies adjacent to first side surface 7 of groove 4, and has a profile bounded essentially at right angles. Surface 15 lying between sealing edge 9 and bounding surface 14 of wiper ring 8 is formed at a slight angle, and, in the unloaded state of seal 2, lies at an angle $\beta$ to sealing surface 20 and sealing axis 6, which is a maximum of 8°. Sealing edge ring 8 has one or, distributed over its circumference, several discharge openings 16 which are positioned between sealing edge 9 and outer surface 13 of sealing edge ring 8, and open up into bounding surface 14.

When there is overpressure in space 1 to be sealed, sealing edge ring 8 lies with its sealing edge 9 against machine part 11, and with its bounding surface 14 against side surface 7 of groove 4. As soon as overpressure has built up in inner space 27, between primary seal 2 and secondary seal 3, which is higher than the pressure in space 1, pressure fluid can reach between side surface 7 of groove 4 and bounding surface 14 of wiper ring 8, and is conducted from there to pressure space 1 through discharge openings 16.

Primary seal 2 is illustrated on an enlarged scale in FIG. 2. Sealing edge ring 8 and profile ring 10 are fitted into groove 4. Sealing edge ring 8 is provided with sealing edge 9 lying adjacent to machine part 11. With its ring surface 29 of bounding surface 14 directed towards the center axis, sealing edge ring 8 lies adjacent to side surface 7 of groove 4, which faces away from space 1 to be sealed. Discharge openings 16 are applied in such a way that they can produce a connection of space 1 to be sealed to space 27 which lies between primary seal 2 and secondary seal 3. The position of discharge openings 16 within wiper ring 8 can be arbitrary. For the effectiveness of the sealing ring it is important that, during a pressure difference between space 1 and space 27, bounding surface 14 having orifice 30 of discharge opening 16 should lie against side surface 7 of groove 4, so that orifice 30 is closed. For this purpose, sealing edge ring 8 is pressed against side surface 7. As soon as the pressure in space 27 exceeds the pressure in space 1, for whatever reason, sealing edge ring 8 is pressed slightly in the direction towards space 1, and fluid can get from space 27 between the gap created between ring surface 29 and side surface 7 to orifices 30 of discharge openings 16, and thereby via discharge openings 16 into space 1, until the pressure has been equalized again.

The cross section of discharge openings 16 is dimensioned so that even at relatively low pressurization of space 1, sealing edge ring 8 lies against side surface 7 of groove 4 with its surface 14. Preferably, angle $\delta$ between bounding surface 14 and surface 15 on the inner side of sealing edge ring 8 is 90°. The two angles $\beta$ between bounding surface 14 and side surface 7, and inner surface 15 of sealing edge ring 8 and surface 20 of machine part 11 may lie between 0° and 8°. The angle $\alpha$ from sealing edge to space 1 may take on a magnitude appropriate to the structural conditions. The discharge opening may have a cross section of 0.19 and 3.1 mm².

In FIG. 3 an embodiment of primary seal 2 is selected in which sealing edge ring 8 is additionally provided with a circumferential support protuberance 31. By the use of this protuberance 31, the sealing edge ring is additionally supported on machine part 11. Space 32 between sealing edge 9 and support protuberance 31 is connected to space 1 via a plurality of axial grooves. In this manner space 32 is ventilated. Discharge openings 16 lie with their input openings 34 close to axial grooves 33. During its production, the nominal diameter of support protuberance 31 is essentially equal to the nominal diameter of sealing edge 9.

In addition, sealing edge ring 8 has a projection 35 on its side facing away from space 1, with which it reaches behind profile ring 10. Profile ring 10 also is provided with side protuberance 36, by which it supports itself on side surface 37 of groove 4.

What is claimed is:

1. A rod or piston primary seal, comprising: a primary seal (2) facing space (1) to be sealed and a secondary seal (3) facing away from it, in which the primary seal (2) is fitted into a groove (4) of a holding element (5), open in a direction of the relatively movable machine part (11) which is bounded, on a side facing away from the space (1) to be sealed, by a first side surface (7) which extends essentially at right angles to sealing axis (6), and contains a sealing edge ring (8) made of tough, hard plastic which has a sealing edge (9) lying adjacent to the machine part (11), and is pressed against the machine part (11) with its sealing edge (9) by a profile ring (10), made of elastomeric material, which is supported on the bottom surface (12) of the groove (4) and lies adjacent to the sealing edge ring (8) with its inner surface (13), wherein the sealing edge ring (8) has a profile bounded essentially by a right angle between the sealing edge (9) and a bounding surface (14) facing the first side surface (7); and, in a relieved state of the seal (2), a surface (15) bounding the sealing edge (9) on the side facing away from the pressure subtends an angle ($\beta$) of at most 8° with the sealing axis (6); and the sealing edge ring (8) is penetrated by at least one discharge opening (16) positioned between the sealing edge (9) and the outer surface of the sealing edge ring (8) and opens out onto the bounding surface (14) wherein the discharge opening directly contacts the bounding surface and the discharge opening directly contacts the first side surface during a pressure difference between a higher pressure side and a lower pressure side of the primary seal, the higher pressure side facing space (1) to be sealed.

2. The rod or piston primary seal according to claim 1, wherein the discharge opening (16) has a cross section of 0.19 and 3.1 mm$^2$.

3. The rod or piston primary seal according to claim 2, wherein the sealing edge ring (8) reaches behind the profile ring (10) with a projection (35) on the side facing away from the space (1) to be sealed.

4. The rod or piston primary seal according to claim 2, wherein the profile ring (10) is supported by a side protuberance (36) on the side surface (37) of the groove (4) facing the space (1) to be sealed.

5. The rod or piston primary seal according to claim 1, wherein the sealing edge ring (8) reaches behind the profile ring (10) with a projection (35) on the side facing away from the space (1) to be sealed.

6. The rod or piston primary seal according to claim 5, wherein the profile ring (10) is supported by a side protuberance (36) on the side surface (37) of the groove (4) facing the space (1) to be sealed.

7. The rod or piston primary seal according to claim 1, wherein the profile ring (10) is supported by a side protuberance (36) on the side surface (37) of the groove (4) facing the space (1) to be sealed.

8. A rod or piston primary seal, comprising: a primary seal (2) facing space (1) to be sealed and a secondary seal (3) facing away from it, in which the primary seal (2) is fitted into a groove (4) of a holding element (5), open in a direction of the relatively movable machine part (11) which is bounded, on a side facing a way from the space (1) to be sealed, by a first side surface (7) which extends essentially at right angles to sealing axis (6), and contains a sealing edge ring (8) made of tough, hard plastic which has a sealing edge (9) lying adjacent to the machine part (11), and is pressed against the machine part (11) with its sealing edge (9) by a profile ring (10), made of elastomeric material, which is supported on the bottom surface (12) of the groove (4) and lies adjacent to the sealing edge ring (8) with its inner surface (13), wherein the sealing edge ring (8) has a profile bounded essentially by a right angle between the sealing edge (9) and a bounding surface (14) facing the first side surface (7); and, in a relieved state of the seal (2), a surface (15) bounding the sealing edge (9) on the side facing away from the pressure subtends an angle (β) of at most 8° with the sealing axis (6); and the sealing edge ring (8) is penetrated by at least one discharge opening (16) positioned between the sealing edge (9) and the outer surface of the sealing edge ring (8) and opens out onto the bounding surface (14), wherein the sealing edge ring (8) has a circumferential support protuberance (31) on the side of the sealing edge (9) facing the space (1) to be sealed, and a space (32) between the sealing edge (9) and the support protuberance (31) is ventilated by at least one axial groove (33) in the support protuberance (31).

9. The rod or piston seal according to claim 8, wherein the support protuberance (31) has a nominal diameter which matches that of the sealing edge (9) during production of the seal.

10. The rod or piston primary seal according to claim 9, wherein the profile ring (10) is supported by a side protuberance (36) on the side surface (37) of the groove (4) facing the space (1) to be sealed.

11. The rod or piston primary seal according to claim 8, wherein the sealing edge ring (8) reaches behind the profile ring (10) with a projection (35) on the side facing away from the space (1) to be sealed.

12. The rod or piston primary seal according to claim 11, wherein the profile ring (10) is supported by a side protuberance (36) on the side surface (37) of the groove (4) facing the space (1) to be sealed.

13. The rod or piston primary seal according to claim 8, wherein the profile ring (10) is supported by a side protuberance (36) on the side surface (37) of the groove (4) facing the space (1) to be sealed.

14. A rod or piston primary seal, comprising: a primary seal (2) facing space (1) to be sealed and a secondary seal (3) facing away from it, in which the primary seal (2) is fitted into a groove (4) of a holding element (5), open in a direction of the relatively movable machine part (11) which is bounded, on a side facing away from the space (1) to be sealed, by a first side surface (7) which extends essentially at right angles to sealing axis (6), and contains a sealing edge ring (8) made of tough, hard plastic which has a sealing edge (9) lying adjacent to the machine part (11), and is pressed against the machine part (11) with its sealing edge (9) by a profile ring (10), made of elastomeric material, which is supported on the bottom surface (12) of the groove (4) and lies adjacent to the sealing edge ring (8) with its inner surface (13), wherein the sealing edge ring (8) has a profile bounded essentially by a right angle between the sealing edge (9) and a bounding surface (14) facing the first side surface (7); and, in a relieved state of the seal (2), a surface (15) bounding the sealing edge (9) on the side facing away from the pressure subtends an angle (β) of at most 8° with the sealing axis (6); and the sealing edge ring (8) is penetrated by at least one discharge opening (16) positioned between the sealing edge (9) and the outer surface of the sealing edge ring (8) and opens out onto the bounding surface (14), wherein the discharge opening (16) has a cross section of 0.19 and 3.1 mm$^2$, wherein the sealing edge ring (8) has a circumferential support protuberance (31) on the side of the sealing edge (9) facing the space (1) to be sealed, and a space (32) between the sealing edge (9) and the support protuberance (31) is ventilated by at least one axial groove (33) in the support protuberance (31).

15. The rod or piston seal according to claim 14, wherein the support protuberance (31) has a nominal diameter which matches that of the sealing edge (9) during production of the seal.

16. The rod or piston primary seal according to claim 15, wherein the sealing edge ring (8) reaches behind the profile ring (10) with a projection (35) on the side facing away from the space (1) to be sealed.

17. The rod or piston primary seal according to claim 15, wherein the profile ring (10) is supported by a side protuberance (36) on the side surface (37) of the groove (4) facing the space (1) to be sealed.

18. The rod or piston seal according to claim 14, wherein the support protuberance (31) has a nominal diameter which matches that of the sealing edge (9) during production of the seal.

19. The rod or piston primary seal according to claim 14, wherein the sealing edge ring (8) reaches behind the profile ring (10) with a projection (35) on the side facing away from the space (1) to be sealed.

* * * * *